G. LANZIUS.
AEROPLANE.
APPLICATION FILED JAN. 21, 1916.
1,289,206.
Patented Dec. 31, 1918.
9 SHEETS—SHEET 1.
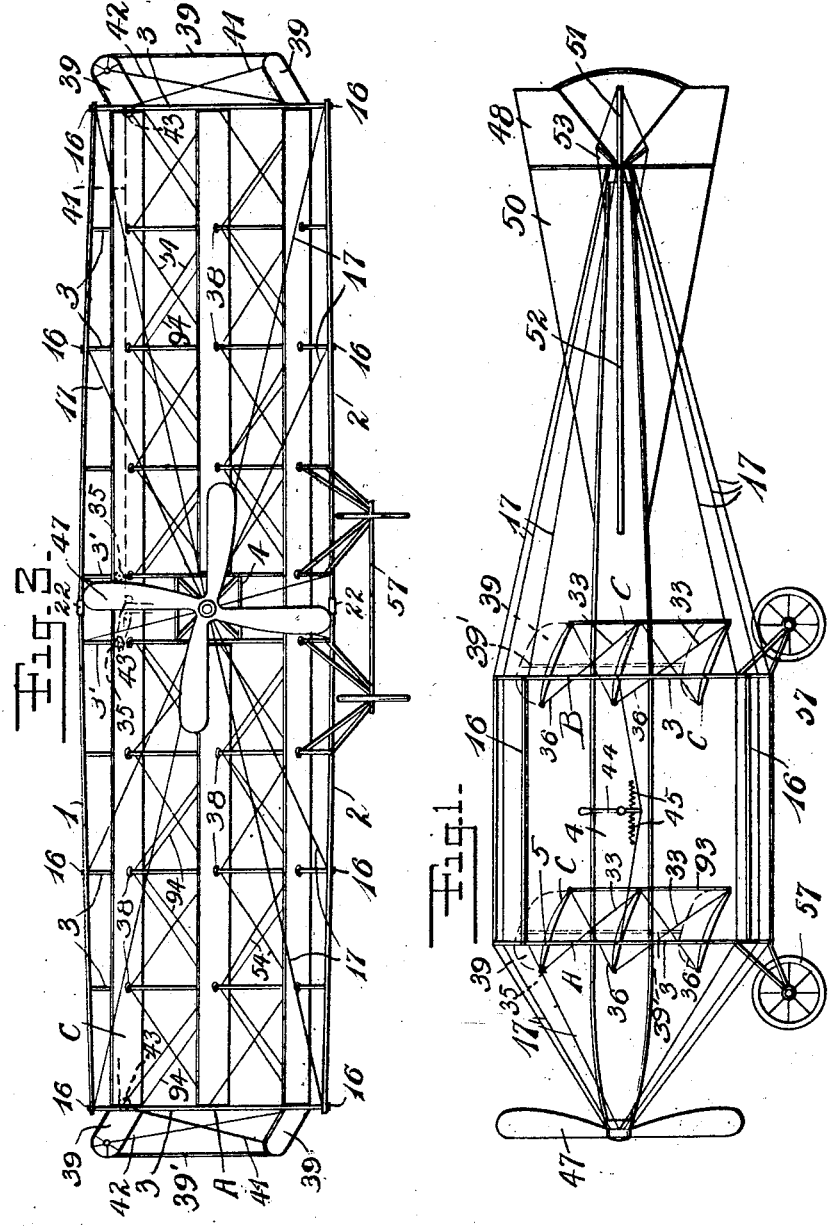
Inventor
GEORGE LANZIUS
By his Attorney

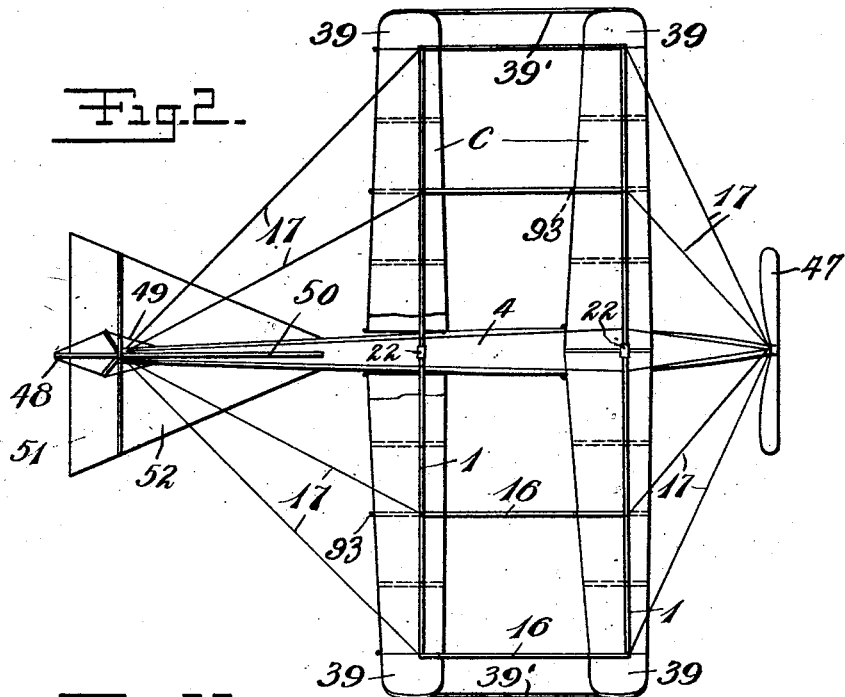

G. LANZIUS.
AEROPLANE.
APPLICATION FILED JAN. 21, 1916.
1,289,206.
Patented Dec. 31, 1918.
9 SHEETS—SHEET 3.
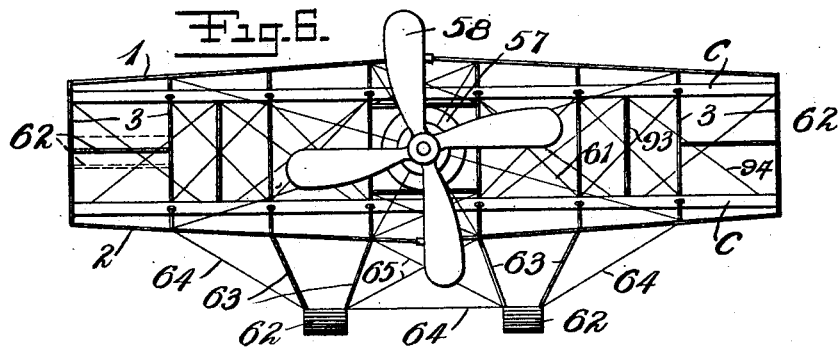
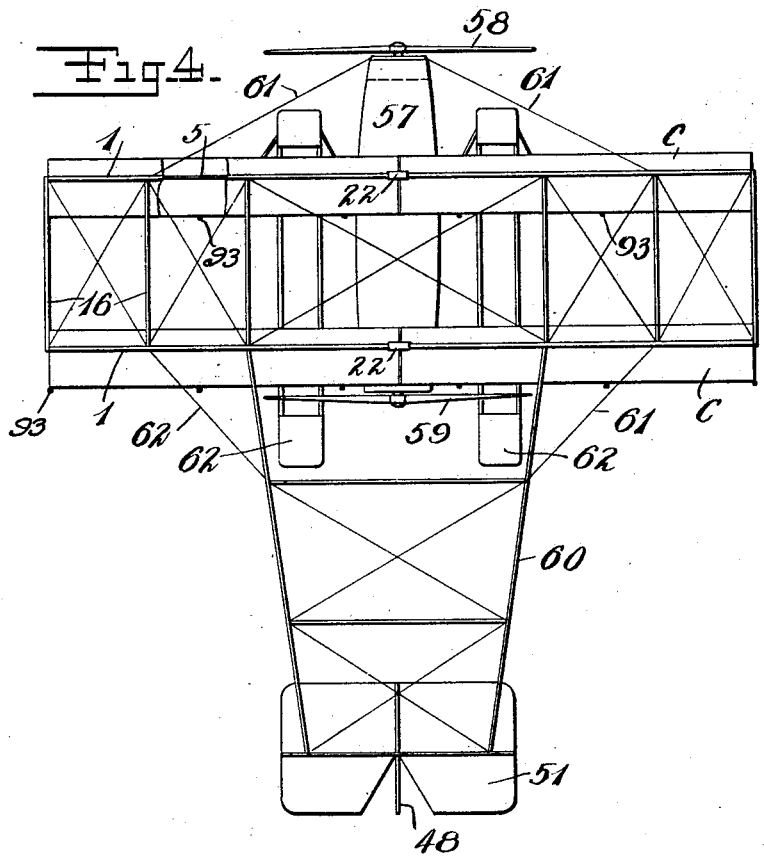
Inventor
GEORGE LANZIUS
By his Attorney

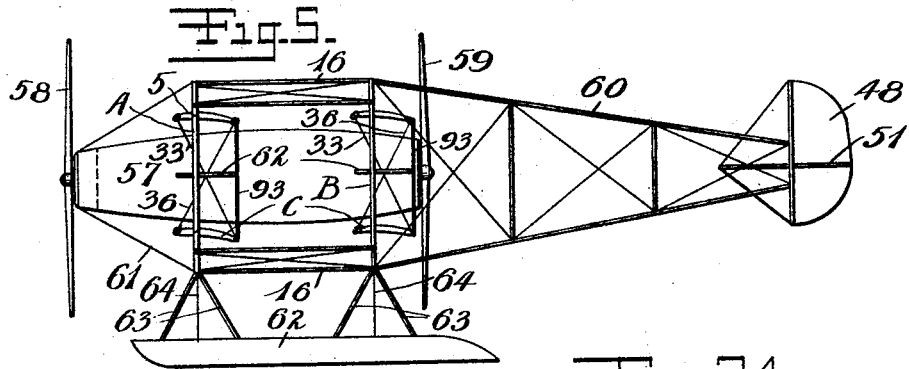
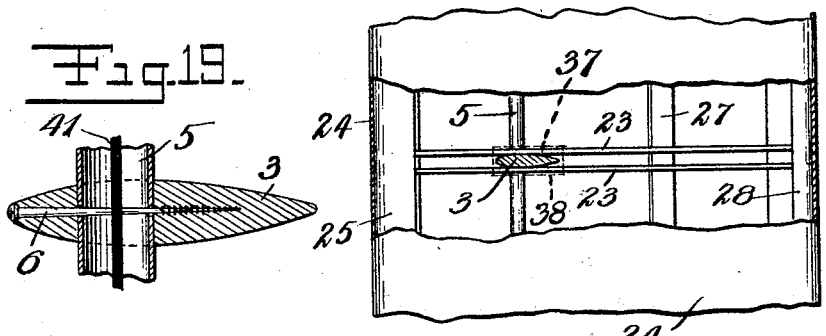
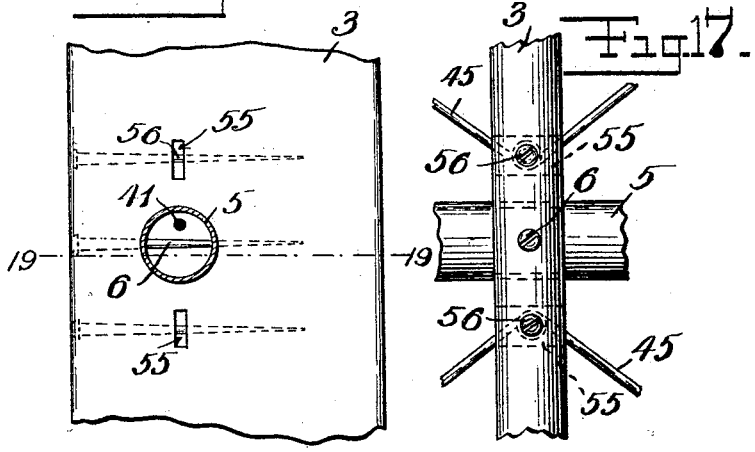

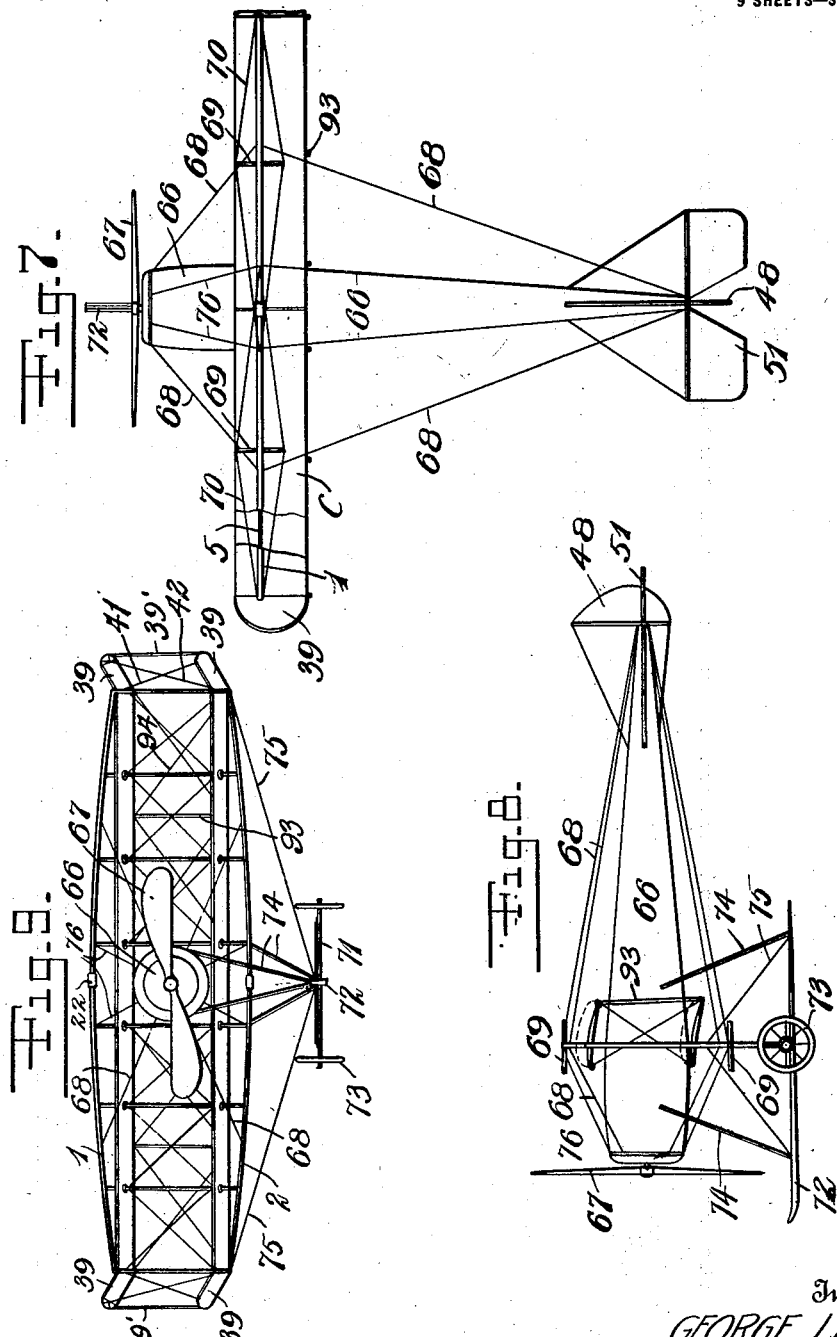

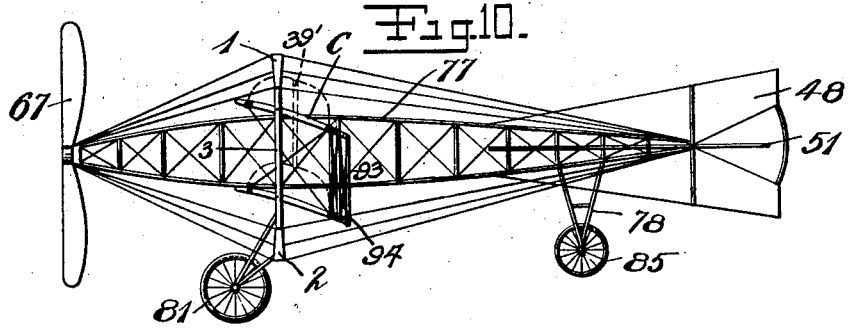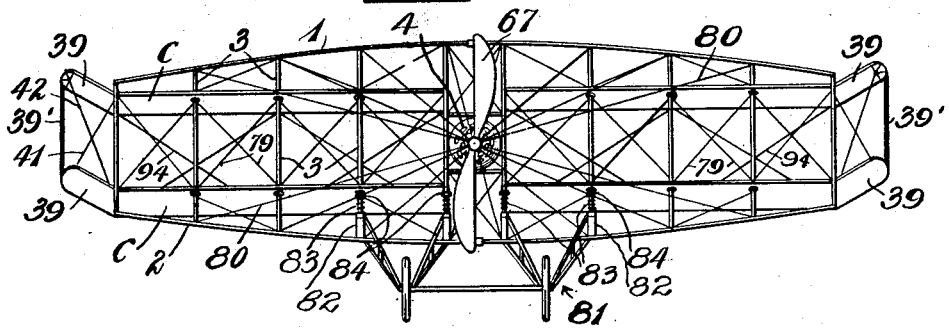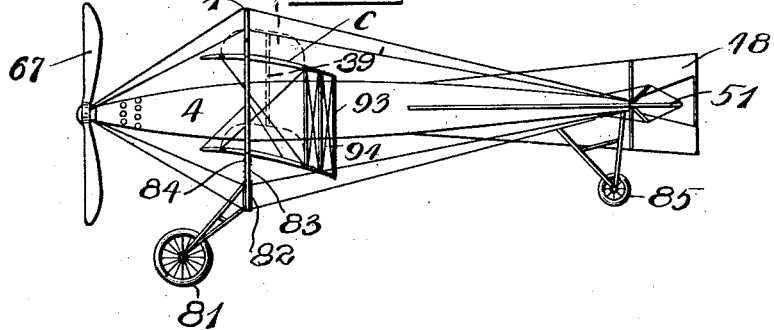

G. LANZIUS.
AEROPLANE.
APPLICATION FILED JAN. 21, 1916.
1,289,206.
Patented Dec. 31, 1918.
9 SHEETS—SHEET 7.
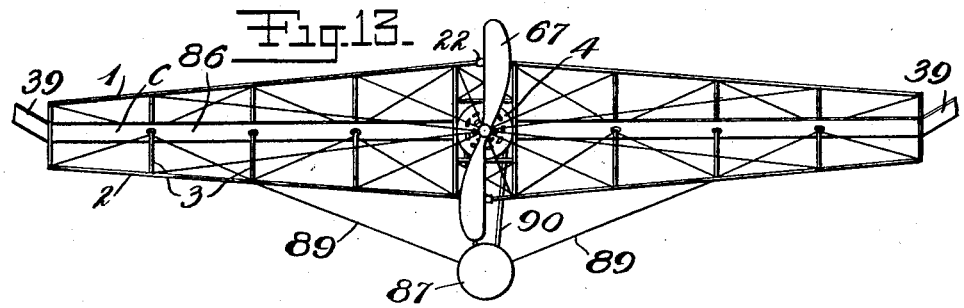
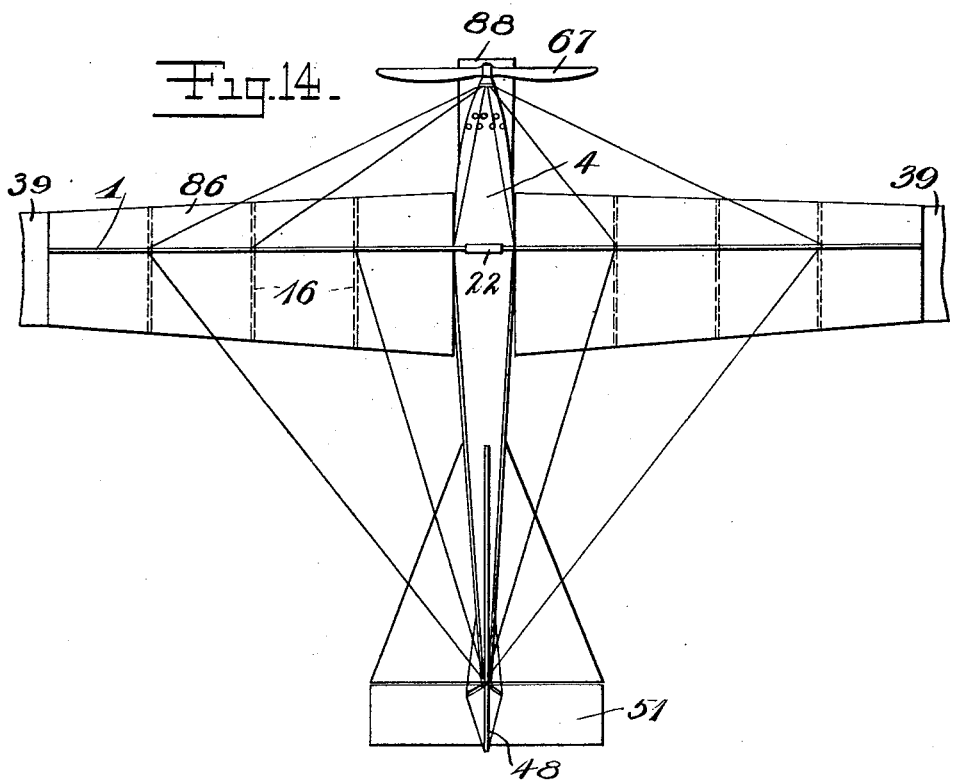
Inventor
GEORGE LANZIUS
By his Attorney

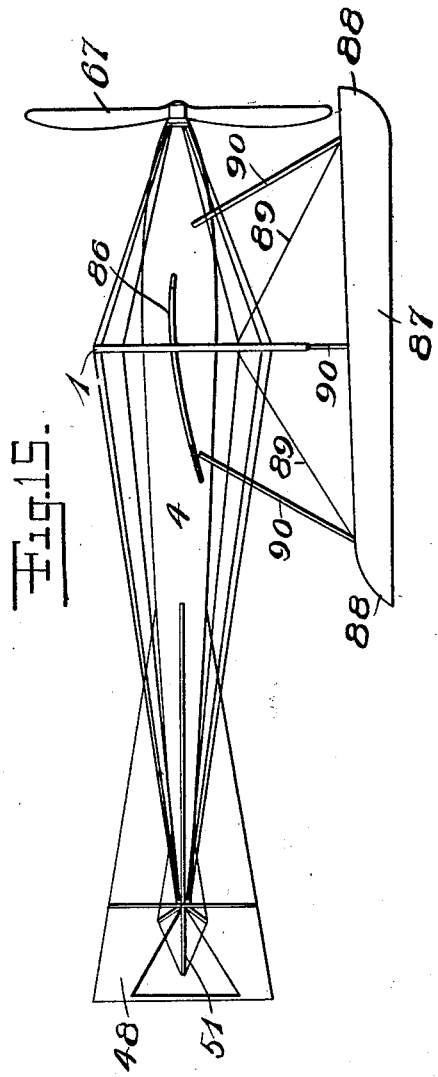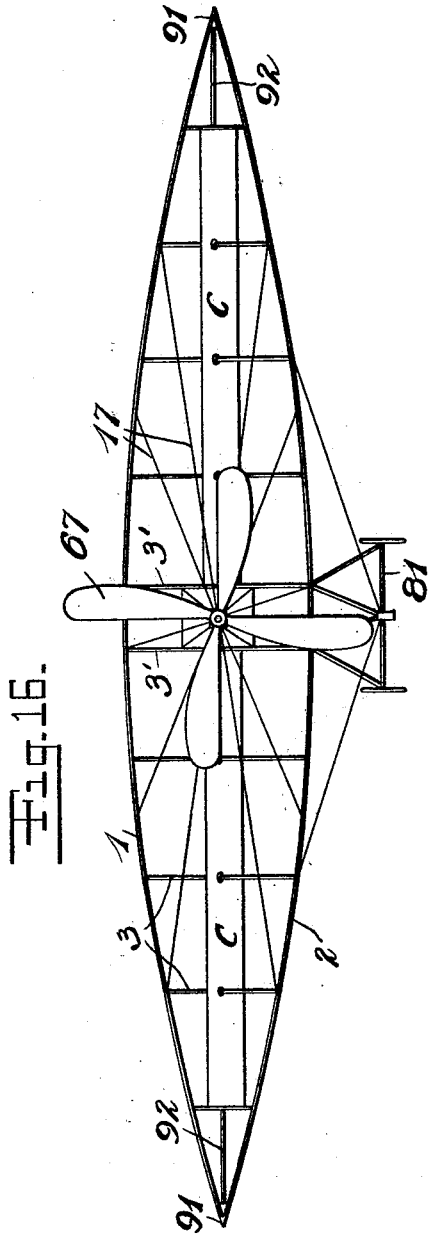

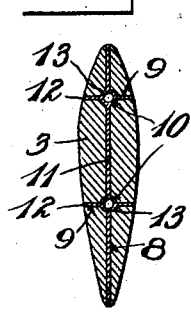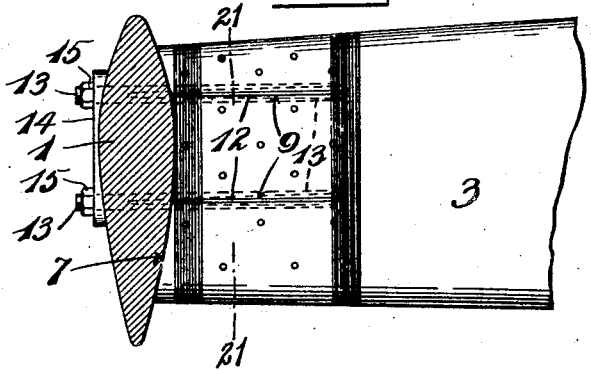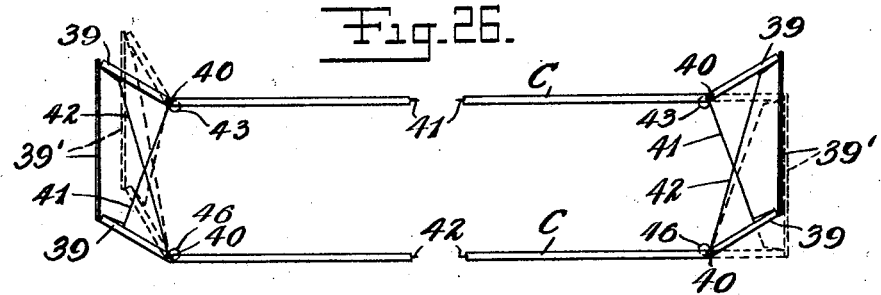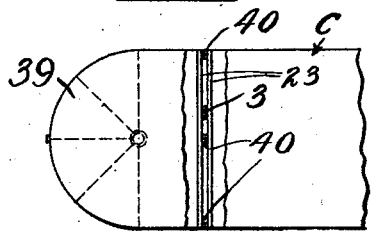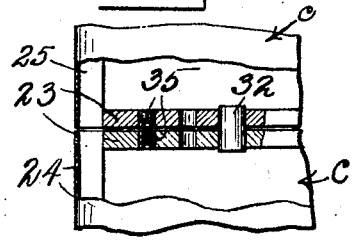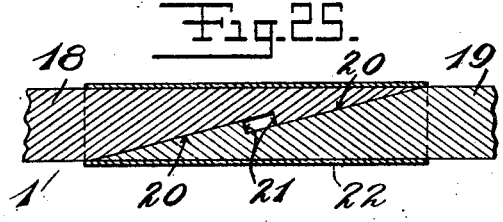

UNITED STATES PATENT OFFICE.

GEORGE LANZIUS, OF NEW YORK, N. Y., ASSIGNOR TO LANZIUS AIRCRAFT COMPANY, A CORPORATION OF DELAWARE.

AEROPLANE.

1,289,206.  Specification of Letters Patent.  Patented Dec. 31, 1918.

Application filed January 21, 1916. Serial No. 73,328.

*To all whom it may concern:*

Be it known that I, GEORGE LANZIUS, a subject of the Queen of the Netherlands, residing at St. Louis Hotel, 34 East 32nd street, borough of Manhattan, in the city, county, and State of New York, have invented new and useful Improvements in Aeroplanes, of which the following is a specification.

This invention relates to improvements in aeroplanes and more particularly to an improved frame structure therefor adapted to carry the main or supporting planes of the machine, the frame structure being assembled and braced in a novel and efficient manner, such as to render the same very strong and rigid and to permit it to withstand the various stresses to which the same is subjected.

A further and important object of the invention is the provision of an improved flying machine having a frame structure and means of novel character for pivotally supporting the carrying or sustaining planes with respect thereto, and which is such that the pivots for the planes are fixed and constitute a bracing means to give rigidity to the frame structure, while the planes are adapted to have pivotal movement thereon for adjustment at varying angles with respect to the horizontal to increase or decrease their buoyant or carrying power and thus increase or decrease the speed of flight, and eliminate as much as is possible, binding engagement between the planes and the frame structure, such as occurs with machines having warping planes supported by movable pivots.

A further object is to provide a rigid supporting plane, pivotally disposed, capable of adjustment while in the air to change the angle of incidence, permitting slow speed in ascending and descending and high speed in flight, and providing means for compensating for loss of weight by consumption of fuel, etc., and an elevator at the rear of the machine operated in coöperation with said plane.

Another purpose is to provide an improved form of aerofoil serving to permit the change of angle of incidence without disturbing the balance of the machine.

Another purpose is to provide improved ailerons which while tending to maintain and restore balance are particularly effective to prevent side slipping.

Among other objects of the invention are to provide a type of frame structure which is adaptable to triplanes, tandem or double triplanes, quadruplanes, biplanes, monoplanes and in general aerodynamical machines of other types, wherein a single, double, or other plural frame structure is employed in connection with a wheeled chassis having suitable landing devices or accoutrements, such as shock absorbing means, or wherein the machine is equipped as a hydroplane having buoyant pontoons or glides adapted to support and permit the operation of the machine upon the surface of water in addition to aerial flights to provide a novel frame structure and bracing means of cantaliver formation adapted for use in connection with various forms of bodies or baskets for the operator, motor and the like, whereby to adapt the device of structures which have been well demonstrated as to their utility and operativeness; to provide novel connections between the longitudinal frame members and the uprights or vertical struts of the frame, as well as between the pivots for the planes and the uprights; to provide means for causing the ascent and descent and controlling the flight in conjunction with the operation of the supporting planes; and generally, to improve the structures of devices of this class for the purposes stated and for other purposes as will appear.

With the above objects and others in view, as will appear as the specification proceeds the invention comprises certain novel arrangements and combinations of parts as will be hereinafter more fully described, and set forth in detail in the accompanying specification, and illustrated in the accompanying drawings in which:

Figure 1 is a side elevation of a tandem-triplane, illustrating one of the preferred forms of embodiment of the invention;

Fig. 2 is a plan view thereof;

Fig. 3 is a front elevation thereof;

Fig. 4 is a plan view of a double-biplane constructed in accordance with the invention, but equipped as a hydroplane having a modified form of propelling arrangement, as well as a modified form of body or basket;

Fig. 5 is a side elevation of the form of device shown in Fig. 4;

Fig. 6 is a front elevation of the same;

Fig. 7 is a plan view of a biplane embodying the principles of the invention;

Fig. 8 is a side elevation of the same;

Fig. 9 is a front elevation thereof;

Fig. 10 is a side elevation of a biplane having a modified form of body;

Fig. 11 is a side elevation of a further modified form of biplane having wheeled chassis or landing devices provided with novel form of shock absorbers;

Fig. 12 is a front elevation of the form of the invention shown in Fig. 11;

Fig. 13 is a front elevation of a monoplane constructed in accordance with the invention;

Fig. 14 is a plan view thereof showing the use of a modified form of pontoon or glide;

Fig. 15 is a side elevation of the form of the invention shown in Figs. 13 and 14;

Fig. 16 is a front elevation of a modified form of biplane;

Fig. 17 is an enlarged detail fragmentary front elevation of a portion of the frame structure and showing the manner of connecting the pivot rods to the uprights of the frame;

Fig. 18 is a side elevation of the construction shown in Fig. 17;

Fig. 19 is a horizontal sectional view taken on the line 19—19 of Fig. 18 and looking in the direction indicated by the arrows;

Fig. 20 is an enlarged fragmentary sectional elevation showing the manner of connecting the longitudinal and vertical frame members;

Fig. 21 is a sectional view taken on the line 21—21 of Fig. 20;

Fig. 22 is a cross-sectional view taken through one of the main or supporting planes;

Fig. 23 is a plan view of one of the ribs and adjacent portions of the plane connected thereto;

Fig. 24 is a perspective detail view of fragmentary portions of a plane and a vertical frame member or upright to show the manner of covering the aperture in the plane through which an upright extends;

Fig. 25 is an enlarged detail sectional view of a joint at the intermediate or central portion of a two-part longitudinal frame member of the frame structure;

Fig. 26 is a diagrammatic detail view illustrating the manner of operating the ailerons;

Fig. 27 is a fragmentary detail view showing the manner of pivoting the ailerons; and Fig. 28 is a detail fragmentary sectional view showing the manner of connecting the sections of the planes.

As illustrated in the drawings, the various forms of the invention embody common general features among which may be mentioned the frame structure; the manner of pivotally supporting the main planes to prevent jamming thereof and permit their operation at will in the control of the flight of the machine in changing the angle of incidence for the purposes to be hereinafter more fully set forth; details of construction of the frame and planes; means for operating the planes, and other features as will hereinafter appear, these features being carried out in the various modifications of the underlying principles of the invention. In the form of the invention illustrated in Figs. 1, 2 and 3, an aeronautical machine in the form of a tandem triplane, is shown, the same comprising similar front and rear barrel-like frames A and B both vertically disposed and spaced apart one in the rear of the other and in true horizontal alinement. Each frame pivotally carries a plurality of planes C, but it is to be understood that the number of frames as well as the number of planes will vary in accordance with the particular type of aerodynamical machine to be constructed.

Each frame is made up of a pair of longitudinal frame members consisting of arched top and bottom members 1 and 2, which are oppositely bowed with their ends located more closely adjacent than the central portions thereof, and connected at spaced points by struts constituting connecting means between said top and bottom frame members, so as to produce extremely strong and rigid frames. These struts are in the form of uprights or vertical frame members 3 joined at their top and bottom extremities to the frame members 1 and 2 at suitably spaced points or intervals along the lengths of said bowed members, and preferably at equi-distantly spaced points from the outer ends thereof so that the innermost frames 3' are spaced apart in such a manner as to provide attaching and supporting means for a fuselage or body 4. In the form illustrated, this body is of stream line form, being in the nature of a shell adapted to contain the motor, fuel supply tank and other mechanism as is customary, as well as to accommodate the operator, but it is desired that it be understood that applicant does not wish to restrict himself to the employment of this particular type of body and that other forms may be used without departing from the spirit of the invention.

Running longitudinally of the frame structures and intersecting the vertical frame members 3 and 3', are stationary pivots 5, the same being in the form of tubes and disposed through apertures in the uprights. In order to reduce the resistance offered to the travel of the machine, the frame members are also made of stream line form, that is, substantially lenticular or boat-shaped in cross section, thereby reducing the friction to a minimum. The connection of the tubes to the various uprights is effected by means of fastening members in the form of screws 6 passing horizontally through the tubes from the edge portions of the uprights, the heads of the screws being shaped in conformity to the contour of the uprights and extending approximately two-thirds through the latter so as to provide a rigid connection without materially weakening the uprights, but due to the disposal thereof through the walls of the tubes at diametrically opposite points, effecting a very rigid connection between the tubes and the uprights. In this manner, rotation, longitudinal and all movement of the tubes with respect to the uprights and the frame structure as a whole, is prevented, while the frames are braced in such a manner as to prevent torsioning, wabbling or swaying movements thereof, and especially devised to overcome the main weakness in the structure of aeroplanes as heretofore devised.

In order to connect the uprights to the longitudinal frame members, the connection shown in Figs. 20 and 21 of the drawings is employed. As before stated, all of the frame members are of stream line outline in cross section and the extremities of the uprights are shaped as shown at 7 to conform to the contour of the opposed faces of the longitudinal frame members. The extremities of the uprights are split longitudinally for short distances, one split 8 in each extending medially across the same from edge to edge, while a plurality of splits 9 extend through the thickness of each upright and are preferably located at right angles to the slit 8 and substantially equi-distantly on either side of the thickest portion of the upright, and at the points of intersection of the splits, the ends of the uprights are bored out longitudinally to provide circular sockets 10. Web-like attaching plates 11 are fitted in said splits, said plates consisting of flat main portions engaging in the splits 8 and web-portions or fins 12 extending at right angles thereto and engaging in the splits 9, while at the junctures of the portions 11 and 12, hollow bolts 13 are formed. These bolts have their walls gradually increasing in thickness toward their outer extremities, which extremities project from the ends of the uprights and are exteriorly threaded as shown. The corresponding portions of the longitudinal frame members are apertured to receive said projecting extremities of the bolts and the ends have engaged thereon a conforming tie-plate 14, the parts being held in binding connection by lock-nuts 15 engaged on the bolts outwardly of the plate as shown. The ends are riveted and bound with cord or wire.

The spaced frames are connected by bridge members 16 having their extremities bolted to the respective frames at points of connection of the uprights and longitudinal frame members, and are located at suitably spaced points. There are four such members at the top and four at the bottom, in the form of invention shown in Figs. 1, 2, and 3, and in conjunction with the attachment of frames to the body, a rigid connection of the frames is effected. To further add rigidity and brace the structure, guy wires 17 are provided, the same extending from the apex of the body to points of the frames equi-distantly on either side thereof and having their rear ends brought together and attached to the tail portion of the body in any preferred manner. The longitudinal frame members, as well as the planes, are preferably each formed in two sections so as to be readily detachable, the longitudinal members each comprising two sections 18 and 19 having their inner ends cut beveled and tapering to points as shown, while intermediate the beveled edges 20, right angular shoulders 21 are provided so as to slightly project beyond the medial line of the thickness of the frame member whereby to permit them to pass each other in assembling the sections. A sleeve 22 is provided to envelop the interlocking tapered ends of the sections and by preventing outward displacement or separation of the co-acting beveled edges thereof, permit relative movement of the sections due to the spacing apart of the shoulders 21, while the latter by reason of opposing each other in parallel relation, form stops to limit the separation of the sections. This joint, which is shown in Fig. 25 of the drawings, may be spoken of as a compensating joint to allow for undue strains upon the frame structure.

The planes in each form of the invention, aside from their being tapered from their inner portions to their tips are of uniform width throughout their lengths, and are constructed as shown in Figs. 22 and 23 of the drawings. As illustrated, each plane comprises a plurality of ribs 23 extending from the front to the rear edges of the planes and covered in the usual manner as shown at 24. At the front extremities of the ribs, that is, at the entering edge of each plane, the latter is split longitudinally by complemental sections 25 seated in rabbeted portions 26 of the ribs and suitably connected to the latter so as to run lengthwise for connecting the ribs and fastening the covering, as well as to offer the least possible frictional resistance to the passage of the planes through the air. The ribs are further connected by longitudinal braces 27 located at the rear portions thereof; while the trail edge is reinforced by a connecting member 28 having mortise and tenon connection with the ribs. All of the ribs are bored out as shown at 29 to lighten the structure and at a point approximately one-third of the breadth of each plane or the length of each rib, from the entering edge of the plane, each rib is provided with a pivot opening 30 and is reinforced on either side by plates or pieces 31 of wood whereby the planes will have pivotal movement upon the pivots or axles which are secured rigidly to the uprights of the frame structure as hereinbefore specified. In this manner, jamming of the planes is prevented and the free pivotal movement thereby allowed, will insure the planes being under the positive control of the operator at all times. When the planes are constructed in two sections to permit the machine to be taken apart for conveniently shipping the same, the innermost ribs of the respective sections are connected by dowel pins 32 thereby preventing independent movement of the sections of the planes.

As hereinbefore mentioned, an essential feature of the invention is the provision of an aeroplane having planes of changeable angle of incidence, which are distinguishable from the ordinary type of aeroplane having a constant angle of incidence and which is set to carry an economical weight for the installed horsepower only, so that as soon as this economical weight is disturbed or altered, one way or the other, the machine becomes theoretically at fault. In accordance with the present invention the angle of incidence may be varied by moving the planes on their pivots, so that the angle of incidence may be changed to compensate for any alteration in the weight carrying capacity. Again, the heretofore provided machines in order to permit them to alight with a certain weight, are built with a very large area to enable them to leave the ground at a reasonable speed. This large plane area is obviously objectionable on account of frictional resistance during flight, while if the machine were constructed with a small supporting area and a great angle of incidence, this angle of incidence would become objectionable on account of resistance, so that the range of speed has but a very small margin, whereas it is the object of the present machine to provide planes which are small in size but which due to the changeable angle of incidence, a big angle of inclination may be obtained so as to make it possible to alight with a normal speed and to increase the speed during flight by reducing the angle. By this construction, it is maintained that one is able to lift the same weight with this type of machine as would be possible with a machine of fixed angle of incidence, having several times the plane area. To carry out these objects, practically, the center of pressure must be accurate, and with the arrangement of the pivots forward of the center of gravity or at a point about one-third from the forward or entering edge of the plane, the center of pressure is determined by the particular shape of the aerofoils, the degree of curvature from the chord of the arc being as 1 is to 35, though applicant does not wish to be restricted to this particular shape of aerofoils.

In order to operate the planes for the purpose of changing the angle of incidence by varying the angles of disposal thereof, cables are provided running from the body in convenient position for operation by the aviator. For this purpose the planes are made to operate simultaneously so as to be disposed at a common angle and in order to tip the planes, connections 33 are provided between the entering edges of the planes above to the rear edges of the planes below, the cable or cables passing through apertures 34 in the ribs of one or more of the planes and being joined at the center of the machine adjacent to the body after passing over pulleys 35 mounted in the inner ends of the planes and in the frame respectively, for operation under the control of the aviator through the medium of suitable levers or other devices common in the art. The planes are leveled through the medium of cables 36 having opposite connections with the planes, passing through similar apertures 34 in the latter and under similar control independently of the aforesaid cables. In the construction of the planes where the uprights pass therethrough, the ribs are provided in spaced pairs to engage the stationary pivots in the manner heretofore described in connection with Figs. 22 and 23 and openings are left in the covering as shown at 37. Suitable sections 38 of rubber or similar flexible and waterproof material envelop the top and bottom portions of the openings through the planes around the uprights and serve as washers to prevent the passage of air therethrough, thereby preventing any loss in the surface area and carrying capacity of the machine.

In addition to the cantaliver frame construction and bracing means as will be best seen from Fig. 1 of the drawings, means are provided for stabilizing the machine, or restoring the lateral balance or equilibrium thereof when such has become disturbed, or for causing the tipping of the machine in flight for making turns and in addition, to eliminate side slipping and skidding. For this purpose, ailerons 39 are pivoted to the outer edges or tips of one or more of the planes, and for this purpose the curvatures of the planes adjacent their tips are diminished, and the outer ribs are made straight. These ribs are disposed inside of the outermost uprights and the ailerons are made flat and conform at their inner rectilinear edges with the outer edges of the planes, to which the ailerons are pivoted as shown at 40, for vertical swinging movement like wings. These ailerons are normally disposed at an angle of 30° above the horizontal and are movable simultaneously with respect to those ailerons which are attached to both extremities of all of the planes, through the medium of operating cables 41 and 42. The cables 41 are adapted for raising the ailerons, and for this purpose are connected to the top faces of the lower ailerons and extended through the pivot rods of one or more of the planes. These cables operate over pulleys 43 at the outer and inner ends of the pivots and lead off to the body for operation as by connection with an operating lever 44 having suitable compensating springs 45 on opposite sides thereof serving to equalize the strains on the cable, and relieve the latter of excessive tension. The cables 42 are similarly extended over pulleys 46 in connection with the same or another of the stationary pivots, such cables being connected to the bottom faces of the uppermost ailerons and exerting pull in the opposite direction from that exerted by the cables 41. The tips of the ailerons are connected by a rod 39' so as to cause the ailerons to move in unison on axes at right angles to the axes of the planes, and in this manner, the ailerons being normally set at an angle of 30° from the horizontal, no appreciable resistance will be offered to the flight of the machine except in a lateral direction to maintain the machine on an even keel. In causing the machine to tilt to either side, or to restore the equilibrium thereof, the ailerons are operated to raise those on one side up to an angle of 60° from the horizontal, and when so raised, the ailerons at the opposite end of the machine will be lowered between the normal angle of 30° above the horizontal to horizontal when the ailerons at the opposite ends of the machine are disposed at a 60° angle, thus increasing the sustaining power of the machine without offering resistance in flight at one side at which the ailerons are horizontally disposed, but increasing the resistance at the opposite side and offering a substantially vertical surface constituting means to resist lateral motion or side sliding of the machine. It is also maintained that the use of the ailerons disposed normally at an angle, will not materially increase the friction due to the change of the angle of incidence, and with both series of ailerons at the opposite ends of the machine at corresponding angles, the action thereof will be equalized.

With a body as shown in Figs. 1, 2, and 3, a propeller 47 is provided at the forward end and at the tail end of the machine there is provided a vertical rudder 48 operated by cables 49, said rudder being pivoted at the rear edges of fins 50 extending from the body, along which latter the cables extend to a point adjacent the operator's seat or basket. The rudder is adapted for guiding the machine to the right or left, while an elevator 51 pivoted at the rear edges of fins 52 secured horizontally to the body, is provided for causing the ascent or descent of the machine, or to maintain the machine in a true horizontal position in flight, in coöperation with the main planes, and possibly in conjunction with the ailerons, as shall depend upon the skill of the operator. For operating the elevator 51, cables 53 are connected to opposite sides thereof in a similar manner as the connections are effected between the cables 49 and the rudder, suitable arms being provided on the rudder and elevator to obtain the proper leverage for operation thereof by the aviator.

In order to add rigidity to the frame structure, guy wires 54 are provided between the uprights 3 and 3', the same being disposed in crossed relation between the respective planes of the tandem triplane and suitably anchored at their extremities to said uprights. In this construction, the guy wires between the upper and intermediate planes are independent of those between the intermediate and bottom planes, and said guy wires are disposed through openings 55 horizontally through the uprights adjacent to the pivots at points of maximum thickness of the uprights. The wires are passed around screws 56 secured in the uprights in the same manner that the screws 6 are secured thereto, the screws 56 passing centrally through the openings 55 and obviating the necessity of securing the wires either directly to the uprights or by means of ferrules or other cumbersome fastening means. A suitable carriage is provided for supporting the machine upon the ground, such as a wheeled chassis 57, but it is to be understood that the form of carriage used may be varied as desired.

In Figs. 4, 5, and 6 of the drawings, a tandem biplane is shown, in which the same general principles are employed, including the structures of the frames and planes, the manner of pivoting the latter, and also the rudder and elevator. However, in lieu of the body 4, a body 57 is secured to the frame structure of the machine, such body terminating a short distance in rear of the rear planes and being provided with double motive power wherein propellers 58 and 59 are mounted at opposite ends of the body. These propellers operate in opposite directions to counteract any tendency to unbalance the machine though they may be operated independently without such danger. A basket-like body 60 is also secured in rear of the frame as means for supporting the usual rudder and elevator, such basket-like body forming the tail of the machine and being of skeleton construction. Bracing wires 61 are extended between the front of the body, the frames and the tail-frame 60, being extended diagonally across the rear portions of the latter in crossed relation for bracing the same as shown. Futhermore, if desired, ailerons 62 may be employed, the same being pivoted between opposed uprights of the respective frames between the planes thereof and movable on a horizontal axis parallel to the axes of the planes. These ailerons are for the purpose of controlling the equilibrium of the machine, and may be employed in lieu of the ailerons shown in Figs. 1, 2, and 3 of the drawings. In this figure the form of carriage shown, consists of a pair of floats 62' braced to the longitudinal and vertical members of the frames by struts 63, while guy wires 64 and 65 extend between the floats and from the latter upwardly to the frames on the outside.

In the form of invention shown in Figs. 7, 8 and 9 of the drawings a biplane is illustrated having the same form of frame structure as described in connection with the previous forms of the invention except that a single frame is employed. The uprights of the frame at the center of the latter serve for the attachment of a body 66 which is formed blunt at its forward end in lieu of being tapered in the manner of formation of the body 4 while a propeller 57 operates in front thereof. Suitable converging guy wires 68 are arranged between the forward end of the body, the frame and the rear portion of the body at any suitable point along the latter, said guy wires as is more particularly shown in Fig. 8, serving to brace the body to the frame and producing a cantaliver construction. In order to strengthen the frame longitudinally, cross arms 69 are secured to the top and bottom portions of the same at points substantially equi-distant on either side of the longitudinal center thereof, and guy wires 70 are extended between the ends of the frame and points beyond the center, so that said wires will intersect approximately at the center of the frame, and when anchored, will prevent warping, or breaking under various strains to which the frame is subjected. Furthermore, with the particular form of wire bracing means including the guy wires extending between the body and frame, both forwardly and rearwardly of the latter, the machine will be braced to withstand vertical stresses in ascending and descending as well as in flight. In this form of the invention a wheeled carriage 71 is employed, the same having a single longitudinal runner 72 centrally thereof, while the wheels 73 are mounted upon the ends of a spring-like axle constituting a portion of the frame as is more clearly shown in Fig. 9. The runner 72 is braced to the body and frame by means of struts 74 and guy wires 75, thereby enabling the carriage to withstand shocks incident to landing and the like. Crossed guy wires 76 are also provided between the body and the top and bottom frame members as is also shown in Fig. 9 of the drawings, while the ailerons, rudder and elevator are as hereinbefore described in connection with Figs. 1, 2, and 3.

In Fig. 10 of the drawings, a machine is shown in which the planes are tapered in contradistinction to the construction of the planes in the form of the invention shown in Figs. 7, 8, and 9, of uniform breadth throughout their lengths. The machine is of the biplane type and the construction is the same as that just described, with the exception of the body 77, the latter being of open frame-like or basket formation and tapering toward its opposite ends in the same manner as the shell-like body shown in Figs. 1, 2, and 3 of the drawings. The other parts are the same as hereinbefore described, with the exception of the rear wheeled carriage 78, which is attached to the body near the tail end thereof, instead of being secured to one of the frames which pivotally support the planes of the machine.

In Figs. 11 and 12 of the drawings a further modified form of biplane is shown, in which besides tapering the planes, the frame supporting the latter is braced by means of guy wires 79 extending between the uprights, such guy wires being located between the planes and connected to the uprights by the fastening means shown in Figs. 17 and 18 of the drawings. Further bracing means in the form of guy wires 80 are provided between the uprights above and below the planes, thereby making a very strong frame structure. The wheeled carriage 81 at the front end of the machine, operates in conjunction with the frame structure and includes a plurality of sleeves 82 slidable on circular lower portions of the uprights, two of which are employed on either side of the body at the center of the machine. These sleeves operate against expansible springs 83 also mounted on the uprights above the sleeves and held from upward displacement by stops 84, so that shocks incident to landing will be absorbed by the springs and injury to the machine will be prevented. A wheeled carriage 85 is also mounted at the tail end of the machine, being secured to the body as hereinbefore described.

In Figs. 13, 14, and 15, one form of monoplane is illustrated. In this form of the invention a body similar to that shown in Figs. 1 to 3 inclusive, and 11 and 12, is employed, but the planes 86 are tapered and terminate at either side of the body whereby to be medially located between the top and bottom portions of the frame. Said top and bottom frame members are made gable-like instead of arched, as is shown and described in connection with the other forms of the invention, the sections of said top and bottom or longitudinal frame members terminating at the center of the machine and being rectilinear throughout their lengths. In this form of the invention a cylindrical pontoon or slide 87 is employed, the same having its opposite ends tapered as shown at 88, in a similar manner as the pontoons or floats 62 are tapered, except that the latter pontoons are of rectangular cross-section. The pontoon 87 is braced to the frame by longitudinal and transverse guy wires 89, while struts 90 connect the pontoon to the body or fuselage corresponding to the body 66.

In Fig. 16 of the drawings, a modified form of monoplane is shown in which the longitudinal or top and bottom frame members are brought together and joined at their outer ends as shown at 91, the shape of the frame structure in front elevation being substantially lenticular. In this construction the uprights are shortened in a more marked degree toward the extremities of the frame, and in lieu of the angularly disposed ailerons pivoted to the tips of the planes ailerons 92 are employed and are pivoted between the outermost uprights and the joined outer extremities of the longitudinal frame members so as to have pivotal movement in the same manner as described in connection with the ailerons 62. With this type of structure the guy wires between the uprights are omitted but the body is braced to the frame, as is also the carriage.

In the operation of any of the forms of the invention as described, the main plane or planes are tilted with their entering edges raised and their trail edges lowered so as to give a large angle of incidence and maximum lifting capacity. The machine being loaded to the desired or maximum extent, the propellers are speeded by the operation of the engines, all of the planes being simultaneously set. At the same time, the rudder is maintained in a central position and the elevator at the tail end of the machine tilted with its rear edge above its forward edge, thereby assisting in the ascent of the machine. If the ailerons 62 having longitudinal pivots are employed, these ailerons may be used in conjunction with the main planes and elevator for causing the ascent of the machine.

When the desired height is obtained, the ailerons may be leveled, but ordinarily said ailerons will not be used for purposes of causing the ascent and descent of the machine, but will be used by independently tilting the same in an opposite manner to cause sidewise tilting of the entire machine as in making a turn, or for the purpose of restoring the machine to its equilibrium when the machine has become unbalanced.

The main planes are during horizontal flight, somewhat leveled to decrease the angle of incidence sufficient to sustain the machine in flight without causing its ascent or descent and the elevator will be operated in conjunction therewith for this purpose. As the load of the machine decreases the angle of incidence may be changed, all of the main planes being moved in unison to compensate for the alteration in the required weight carrying capacity. By this means it is possible to obtain a maximum degree of lifting power with a machine of minimum surface area, thereby reducing considerably the size and cost of the machine and enabling the machine to be put under positive control at all times. A wide range between fast and slow speeds is also made possible, the smallness of the planes allowing greater speed and the possibility of varying the angle of inclination, making it possible to alight with a normal speed and a big angle of inclination. After leaving the ground the speed may be increased by the reduction of the angle.

In order to hold the planes of multiple plane machines such as triplanes, biplanes and the like, equi-distantly spaced apart in parallel relation, rigid connections 93 are provided at spaced points between the top and bottom planes, such connections being joined to the intermediate planes where more than two are employed and being connected to the rear edges of the planes by hinges or the like to allow simultaneous pivoting of the planes in tilting and leveling the same. These connections are braced by guy wires 94, and it will thus be seen that should the cables 41 and 42 for operating the planes C or either of them break, the planes would be held against independent movement and unbalancing of the machine can thereby be prevented.

Having thus described my invention, what I claim as new and desire to secure by Letters Patent of the United States is:

1. An aeroplane including a body, a transverse frame structure braced to the body, said frame structure comprising longitudinal frame members and vertical frame members rigidly connecting the same, a rigid axle extending longitudinally of the frame structure and connected to the uprights to prevent rotary and translatory movement thereof, planes having apertured ribs pivotally mounted upon said axle for movement independently of the frame and axle, propulsion means supported by the body, bracing means between the body and frame structure at the top and bottom portions of the latter, a carriage beneath the body and frame structure, ailerons at the ends of the frame structure, a rudder at the tail end of the body, an elevator also positioned at the tail end of the body and independent means for operating the respective planes, ailerons, rudder and elevator from the body, and shock absorbers for the carriage.

2. An aeroplane comprising a frame structure including top and bottom arched members inclining toward each other at their outer ends and rigid planes pivoted across the entire frame intermediate of the arched members to move independently of the supports thereof.

3. An aeroplane comprising a transverse frame structure having longitudinal arched members converging toward each other in the direction of their outer ends, rigid planes pivoted across the entire frame intermediate of the arched members and arranged to move independently of the supports thereof, said planes being tapered toward their trail edges, and leveling planes pivoted upon horizontal axes near the extremities of said planes.

4. An aeroplane comprising a frame structure, curved planes pivoted across the frame to move independent of the supports thereof, said planes being tapered toward their trail edges, and ailerons mounted upon axes transversely of the planes adjacent the outer lateral margins thereof, said ailerons being disposed upward in angular relation to the planes and movable in unison in opposite directions, whereby to dispose one of said ailerons toward the horizontal, and the other of said ailerons toward the vertical so as to offer lateral resistance to prevent side slip.

5. In an aeroplane, a frame structure including arched top and bottom frame members having their extremities converging, uprights between said top and bottom frame members and rigidly connected thereto, and plane supporting pivots extending horizontally through the uprights and connected to the latter against rotary and translatory movement, whereby to prevent lateral swaying of the frame structure and to pivotally support planes thereon for movement independent of their pivots, and planes disposed on the pivots and extending entirely across the structure.

6. In an aeroplane, a rigid frame structure having arched top and bottom members singly extending across the machine, spaced vertical frame members between said top and bottom frame members, said vertical frame members having their end portions split in two directions, web-like plates secured in said split end portions and having stems projecting therefrom, said top and bottom frame members having openings receiving said stems, and fastening means on the stems for securing the top and bottom frame members against displacement.

7. An aeroplane structure comprising top and bottom frame members spaced apart and bowed toward each other in the direction of their extremities, said members being of stream line cross section, uprights between said top and bottom frame members, said uprights being of corresponding cross section and having recessed ends conforming to the faces of the top and bottom frame members, said uprights having their extremities split for short distances at right angles and having circular recesses at the points of intersection of said split portions, web-like plates having fins, said plates being engaged in the split portions of the uprights, fastening means to secure the plates to the uprights and passing through both, bolts formed integral with said plates and having hollow inner portions and threaded extremities projecting beyond the plates and extremities of the uprights, said longitudinal frame members having openings therein receiving said bolts, a strap member on the projecting ends of the bolts, and lock-nuts on said extremities outwardly of said strap member.

8. In an aeroplane, a frame comprising oppositely arched top and bottom frame members, uprights between said frame members and spaced apart equi-distantly from the ends of the top and bottom frame members, said uprights being rigidly connected to said members at their extremities, said members and uprights being of stream line cross section, and tubular pivots disposed through openings in the uprights and secured against movement therein.

9. In an aeroplane, a frame comprising oppositely arched top and bottom frame members, uprights between said frame members, said uprights being rigidly connected at their extremities to said members, said uprights having transverse openings therethrough horizontally alined across the frame, pivot members disposed through said openings, and fastening screws engaged through the uprights and the pivot members to secure the latter against rotation and translation, said pivots being adapted to movably support planes thereon.

10. An aeroplane comprising connected longitudinal and vertical frame members, said frame members being of stream line cross section, said vertical frame members having transversely alined openings therethrough, tubular pivots disposed through the openings throughout the entire length of the frame, screws disposed partially through the vertical frame members edgewise and extending diametrically through the pivots to anchor the same in the openings, said vertical frame members having openings therethrough spaced from the aforesaid openings and said pivots, screws similarly engaged with the vertical frame members and passing through the last-mentioned openings and guy wires bracing the frame and engaged with the screws of the last-mentioned openings.

11. An aeroplane comprising connected longitudinal and vertical frame members, said frame members being of stream line cross section, said vertical frame members having transversely alined openings therethrough, tubular pivots disposed through the openings throughout the entire length of the frame, screws disposed partially through the vertical frame members edgewise and extending diametrically through the pivots to anchor the same in the openings, said vertical frame members having openings therethrough spaced from the aforesaid openings and said pivots, screws similarly engaged with the vertical frame members and passing through the last-mentioned openings, guy wires bracing the frame and engaged with the screws of the last-mentioned openings, a carriage beneath the frame, struts bracing the carriage to the frame, a body supported by the frame and braced to said carriage, propelling means carried by the body in front and rear of the frame and bracing means between the frame and body.

12. An aeroplane comprising connected longitudinal and vertical frame members, said vertical frame members having transversely alined openings therethrough, tubular pivots disposed through the openings throughout the entire length of the frame, screws disposed partially through the vertical frame members edgewise and extending diametrically through the pivots to anchor the same in the openings, planes tiltable on the pivots, said vertical frame members having openings therethrough spaced from the aforesaid openings and said pivots, screws similarly engaged with the vertical frame members and passing through the last-mentioned openings, guy wires bracing the frame and engaged with the screws of the last-mentioned openings, a body attached to the frame and extending transversely of the latter centrally thereof to intersect the planes, guy wires bracing the frame to the body, said guy wires being attached to the frame at spaced points outwardly from the center thereof and extending downwardly for attachment to the body, ailerons at the extremities of the frame, means for oppositely moving the ailerons, means for moving the planes in unison to vary the angle of incidence thereof, a rudder operable to guide the machine to the right or left, and an elevator operable in conjunction with the planes to vary the sustaining power of the machine and maintain the longitudinal balance thereof.

13. In an aerodynamical machine, a plurality of rigid transverse frames, connecting means bracing said frames in spaced relation one in rear of the other, said frames being of barrel-like form in front elevation, stationary axles extending longitudinally of the frames at spaced parallel points one above the other and rigidly connected to the frames, rigid planes pivotally mounted thereon against longitudinal displacement, means for moving said planes, and means for propelling the machine.

14. In an aerodynamical machine, a plurality of rigid transverse frames, connecting means bracing said frames in spaced relation one in rear of the other, said frames being of barrel-like form in front elevation, stationary axles extending longitudinally of the frames at spaced parallel points one above the other and rigidly connected to the frames, rigid planes pivotally mounted thereon against longitudinal displacement, means for moving said planes, a body traversing the frames and planes centrally with respect to the longitudinal dimension thereof and extending longitudinally of the operative direction of the machine, propelling means carried thereby, converging bracing wires between the frames and body, a carriage beneath the frames and body, balancing means, elevating means, and steering means.

15. In combination, a plurality of transverse frames, said frames each comprising longitudinal frame members at the top and bottom portions thereof and arched toward each other at their extremities, uprights having their extremities conforming to the faces of the longitudinal frame members, connecting means between said extremities and said longitudinal frame members to prevent independent movement thereof at the points of connection, rigid pivots extending through the uprights of the frames, fastening means between the uprights and the pivots constituting rigid fastening means between the same and spacing means between the uprights to prevent wabbling of the frames, rigid planes movable on said pivots against torsioning and longitudinal displacement, and means for moving said planes in unison.

16. In combination, a plurality of transverse frames, said frames each comprising longitudinal frame members at the top and bottom portions thereof and arched toward each other at their extremities, uprights having their extremities conforming to the faces of the longitudinal frame members, connecting means between said ends and said longitudinal frame members to prevent independent movement thereof at the points of connection, rigid pivots extending through the uprights of the frames, fastening means between the uprights and the pivots constituting rigid fastening means between the same and spacing means between the uprights to prevent wabbling of the frames, rigid planes movable on said pivots against torsioning and longitudinal displacement, said planes being pivoted forwardly of their longitudinal centers, operating means for said planes passing through the same, a body associated with the frames, propelling means, a carriage beneath the frames, horizontal and vertical fins at the tail end of the body, a rudder contiguous with said vertical fins, an elevator contiguous with said horizontal fins, and means for independently operating said planes, rudder and elevator.

17. In combination, a plurality of transverse frames, said frames each comprising longitudinal frame members at the top and bottom portions thereof and arched toward each other at their extremities, uprights having their extremities conforming to the faces of the longitudinal frame members, connecting means between said ends and said longitudinal frame members to prevent independent movement thereof at the points of connection, rigid pivots extending through the uprights of the frames, fastening means between the uprights and the pivots constituting rigid fastening means between the same and spacing means between the uprights to prevent wabbling of the frames, rigid planes movable on said pivots against torsioning and longitudinal displacement, said planes being pivoted forwardly of their longitudinal centers, operating means for said planes passing through the same, a body associated with the frames, propelling means carried by the body centrally across the frames, a carriage beneath the frames, horizontal and vertical fins at the tail end of the body, a rudder contiguous with said vertical fins, an elevator contiguous with said horizontal fins, a plurality of balancing planes at each end of each plane, said planes being pivoted to the tip edges of the planes outwardly of the frames, means for moving the planes, and means for oppositely swinging the balancing planes.

18. In an aeroplane, a frame structure including top and bottom frame members, vertical uprights secured between said top and bottom frame members, bracing means between said upright and top and bottom frame members being formed in sections joined at the central portions thereof, a body attached to the frame, a carriage braced to the frame and body, pivots between said top and bottom frame members and transversing the uprights at right angles thereto, said pivots being in the form of tubes fixed to the uprights against rotary or translatory movement and planes pivoted for angular movement thereon, said planes being formed in sections terminating at the center of the machine and connected for simultaneous movement.

19. In an aeroplane construction, a frame comprising oppositely arched top and bottom members, parallel uprights between said members, detachable fastening connections between the ends of the uprights and the longitudinal members at spaced points along the latter, said longitudinal members and uprights being of boat-shaped cross section, said longitudinal members being each formed in two sections having their inner ends tapered and provided with opposed shoulders extending beyond the medial line of the breadths of the sections and a sleeve over said ends to join the same for limited longitudinal displacement, said shoulders holding said sections against movement one beyond the other.

20. The combination with a frame structure including horizontal and vertical frame members rigidly braced together; of rigid pivots intersecting the vertical members, curved planes pivoted thereon and having spaced pairs of ribs on either side of said vertical members and a covering with openings therethrough through which said vertical members extend, and washers covering said openings around said vertical members.

21. An aeroplane comprising a frame comprising rigidly connected horizontal and vertical frame strips, pivots passing through the vertical strips and anchored against movement in any direction, rigid planes tiltable on the pivots, means for bracing said planes in spaced parallel relation but to permit simultaneous tilting thereof, means for tilting the planes, ailerons hinged on the ends of the planes at an angle to the axis of the planes, and means for swinging the ailerons.

22. An aeroplane comprising a plurality of transverse uniplanar frames comprising rigidly connected horizontal frame strips and uprights, pivots rigidly connected to the uprights, carrying planes tiltable on the pivots, rigid struts between the edges of the planes and hinged to the latter to hold the same fixedly spaced apart to move as one, cables connected to the front edges of lower planes and passing through the rear portions of the upper plane for tilting the planes, and cables connected to the rear edges of the lower planes and passing through the front portions of the upper plane for leveling the planes.

In testimony whereof I have signed my name to this specification in the presence of two subscribing witnesses.

GEORGE LANZIUS.

Witnesses:
JOHN E. BURCH,
JOHN C. SANDERS.

Copies of this patent may be obtained for five cents each, by addressing the "Commissioner of Patents, Washington, D. C."